(12) United States Patent
Moser et al.

(10) Patent No.: US 9,256,655 B2
(45) Date of Patent: Feb. 9, 2016

(54) DYNAMIC ACCESS OF DATA

(71) Applicants: Gerd Moser, Rauenberg (DE); Thomas Vogt, Roemerberg (DE); Arthur Berger, Bensheim-Auerbach (DE); Gregor Rieken, Walldorf (DE); Ralf Steuernagel, Bruchsal-Buechenau (DE)

(72) Inventors: Gerd Moser, Rauenberg (DE); Thomas Vogt, Roemerberg (DE); Arthur Berger, Bensheim-Auerbach (DE); Gregor Rieken, Walldorf (DE); Ralf Steuernagel, Bruchsal-Buechenau (DE)

(73) Assignee: SAP SE, Walldorf (DE)

( * ) Notice: Subject to any disclaimer, the term of this patent is extended or adjusted under 35 U.S.C. 154(b) by 74 days.

(21) Appl. No.: 13/861,665

(22) Filed: Apr. 12, 2013

(65) Prior Publication Data

US 2013/0232105 A1    Sep. 5, 2013

Related U.S. Application Data

(63) Continuation of application No. 10/662,125, filed on Sep. 12, 2003, now Pat. No. 8,438,238, which is a continuation-in-part of application No. 10/365,672, filed on Feb. 12, 2003, now abandoned.

(60) Provisional application No. 60/419,292, filed on Oct. 16, 2002, provisional application No. 60/447,556, filed on Feb. 13, 2003.

(51) Int. Cl.
  *G06F 15/16*    (2006.01)
  *G06F 17/30*    (2006.01)
  *H04L 29/08*    (2006.01)

(52) U.S. Cl.
  CPC ...... *G06F 17/30563* (2013.01); *H04L 67/2823* (2013.01)

(58) Field of Classification Search
  None
  See application file for complete search history.

(56) References Cited

U.S. PATENT DOCUMENTS

| | | | |
|---|---|---|---|
| 4,459,663 | A | 7/1984 | Dye |
| 5,099,431 | A | 3/1992 | Natarajan |
| 5,182,705 | A | 1/1993 | Barr et al. |
| 5,191,534 | A | 3/1993 | Orr et al. |
| 5,311,424 | A | 5/1994 | Mukherjee et al. |
| 5,335,346 | A | 8/1994 | Fabbio |
| 5,418,945 | A | 5/1995 | Carter et al. |
| 5,442,782 | A | 8/1995 | Malatesta et al. |

(Continued)

FOREIGN PATENT DOCUMENTS

| | | |
|---|---|---|
| CA | 2391829 A | 6/2001 |
| DE | 10049940 A1 | 4/2002 |

(Continued)

OTHER PUBLICATIONS

"U.S. Appl. No. 10/137,208, response filed Jan. 13, 2009 to Examiner's Answer mailed Nov. 13, 2008", 5 pgs.

(Continued)

*Primary Examiner* — Thomas Dailey
(74) *Attorney, Agent, or Firm* — Schwegman Lundberg & Woessner, P.A.

(57) ABSTRACT

A heterogeneous information technology system in which compatible and incompatible client systems are able to dynamically access master data stored in a master database maintained by a master data server. An integration server communicates with the client systems and the master data server, and in response to a request for data from a client system, maps the master data in the master database to mapped data based on a set of mapping rules associated with the client system, and sends the mapped data to the client system.

18 Claims, 6 Drawing Sheets

(56) References Cited

U.S. PATENT DOCUMENTS

| | | |
|---|---|---|
| 5,655,085 A | 8/1997 | Ryan et al. |
| 5,666,553 A | 9/1997 | Crozier |
| 5,694,598 A | 12/1997 | Durand et al. |
| 5,703,938 A | 12/1997 | Lucas et al. |
| 5,710,884 A | 1/1998 | Dedrick |
| 5,758,031 A | 5/1998 | De Silva |
| 5,794,234 A | 8/1998 | Church et al. |
| 5,845,283 A | 12/1998 | Williams et al. |
| 5,859,972 A | 1/1999 | Subramaniam et al. |
| 5,870,759 A | 2/1999 | Bauer et al. |
| 5,878,422 A | 3/1999 | Roth et al. |
| 5,909,570 A | 6/1999 | Webber |
| 5,911,139 A | 6/1999 | Jain et al. |
| 5,911,776 A | 6/1999 | Guck |
| 5,966,715 A | 10/1999 | Sweeney et al. |
| 5,974,449 A | 10/1999 | Chang et al. |
| 5,996,009 A | 11/1999 | Kitamura et al. |
| 6,018,742 A | 1/2000 | Herbert, III |
| 6,026,401 A | 2/2000 | Brealey et al. |
| 6,029,195 A | 2/2000 | Herz |
| 6,032,147 A | 2/2000 | Williams et al. |
| 6,064,970 A | 5/2000 | McMillan et al. |
| 6,067,525 A | 5/2000 | Johnson et al. |
| 6,144,988 A | 11/2000 | Kappel |
| 6,226,650 B1 | 5/2001 | Mahajan et al. |
| 6,236,997 B1 * | 5/2001 | Bodamer et al. |
| 6,253,129 B1 | 6/2001 | Jenkins et al. |
| 6,324,647 B1 | 11/2001 | Bowman-Amuah |
| 6,330,598 B1 | 12/2001 | Beckwith et al. |
| 6,405,132 B1 | 6/2002 | Breed et al. |
| 6,480,755 B1 | 11/2002 | Ootani et al. |
| 6,487,552 B1 * | 11/2002 | Lei et al. |
| 6,487,594 B1 | 11/2002 | Bahlmann |
| 6,529,948 B1 | 3/2003 | Bowman-Amuah |
| 6,549,906 B1 | 4/2003 | Austin et al. |
| 6,560,772 B1 | 5/2003 | Slinger |
| 6,567,818 B1 | 5/2003 | Frey et al. |
| 6,591,278 B1 | 7/2003 | Ernst |
| 6,615,252 B1 | 9/2003 | Oka et al. |
| 6,658,483 B1 | 12/2003 | Iwamoto et al. |
| 6,671,757 B1 | 12/2003 | Multer et al. |
| 6,711,456 B2 | 3/2004 | Yokomori et al. |
| 6,714,894 B1 | 3/2004 | Tobey et al. |
| 6,718,361 B1 | 4/2004 | Basani et al. |
| 6,738,682 B1 | 5/2004 | Pasadyn |
| 6,738,789 B2 | 5/2004 | Multer et al. |
| 6,754,666 B1 | 6/2004 | Brookler et al. |
| 6,768,944 B2 | 7/2004 | Breed et al. |
| 6,816,865 B2 | 11/2004 | O'Brien et al. |
| 6,842,881 B2 | 1/2005 | Croke et al. |
| 6,857,123 B1 | 2/2005 | Nuxoll et al. |
| 6,879,976 B1 | 4/2005 | Brookler et al. |
| 6,883,136 B1 | 4/2005 | Brookler et al. |
| 6,895,408 B1 | 5/2005 | Kavantzas |
| 6,915,287 B1 | 7/2005 | Felsted et al. |
| 6,940,870 B2 | 9/2005 | Hamlin |
| 6,988,111 B2 | 1/2006 | Chow et al. |
| 6,993,717 B2 | 1/2006 | Minninger |
| 7,065,558 B2 | 6/2006 | Ramanathan et al. |
| 7,103,605 B1 | 9/2006 | Hazi et al. |
| 7,243,158 B1 | 7/2007 | Gutchigian |
| 7,249,056 B1 | 7/2007 | Crouthamel et al. |
| 2001/0039540 A1 | 11/2001 | Hofmann et al. |
| 2002/0065892 A1 | 5/2002 | Malik |
| 2002/0073114 A1 | 6/2002 | Nicastro et al. |
| 2002/0073236 A1 | 6/2002 | Helgeson et al. |
| 2002/0087510 A1 | 7/2002 | Weinberg et al. |
| 2002/0095454 A1 | 7/2002 | Reed et al. |
| 2002/0116417 A1 | 8/2002 | Weinberg et al. |
| 2002/0124005 A1 | 9/2002 | Matson et al. |
| 2002/0128904 A1 | 9/2002 | Carruthers et al. |
| 2002/0128946 A1 | 9/2002 | Chehade et al. |
| 2002/0156688 A1 | 10/2002 | Horn et al. |
| 2002/0161778 A1 | 10/2002 | Linstedt |
| 2002/0184308 A1 | 12/2002 | Levy et al. |
| 2002/0194196 A1 | 12/2002 | Weinberg et al. |
| 2003/0018878 A1 | 1/2003 | Dorward et al. |
| 2003/0023604 A1 | 1/2003 | O'Brien et al. |
| 2003/0028447 A1 | 2/2003 | O'Brien et al. |
| 2003/0028519 A1 | 2/2003 | Burgess |
| 2003/0135495 A1 | 7/2003 | Vagnozzi |
| 2003/0161778 A1 | 8/2003 | De Waal |
| 2003/0191832 A1 | 10/2003 | Satyavolu et al. |
| 2003/0233347 A1 | 12/2003 | Weinberg et al. |
| 2004/0015408 A1 | 1/2004 | Rauen et al. |
| 2004/0044730 A1 | 3/2004 | Gockel et al. |
| 2004/0093342 A1 | 5/2004 | Arbo et al. |
| 2004/0117377 A1 | 6/2004 | Moser et al. |
| 2005/0038551 A1 | 2/2005 | Mazumder et al. |
| 2006/0064456 A1 | 3/2006 | Kalthoff et al. |

FOREIGN PATENT DOCUMENTS

| | | |
|---|---|---|
| WO | WO-0137097 A1 | 5/2001 |
| WO | WO-0225471 A2 | 3/2002 |
| WO | WO-0225500 A2 | 3/2002 |
| WO | WO-0247463 A2 | 6/2002 |
| WO | WO-03093998 A2 | 11/2003 |

OTHER PUBLICATIONS

"U.S. Appl. No. 10/365,672, Advisory Action mailed Aug. 12, 2008", 3 pgs.

"U.S. Appl. No. 10/365,672, Appeal Decision mailed Jan. 29, 2013", 8 pgs.

"U.S. Appl. No. 10/365,672, Final Office Action mailed Mar. 25, 2008", 9 pgs.

"U.S. Appl. No. 10/365,672, Non-Final Office Action mailed Sep. 14, 2007", 7 pgs.

"U.S. Appl. No. 10/365,672, Response filed Aug. 30, 2007 to Restriction Requirement mailed Aug. 10, 2007", 5 pgs.

"U.S. Appl. No. 10/365,672, Response filed Dec. 12, 2007 to Non-Final Office Action mailed Sep. 14, 2007", 8 pgs.

"U.S. Appl. No. 10/365,672, Response filed Aug. 4, 2008 to Non-Final Office Action mailed Mar. 25, 2008", 6 pgs.

"U.S. Appl. No. 10/365,672, Restriction Requirement mailed Aug. 10, 2007", 7 pgs.

"U.S. Appl. No. 10/365,672, Restriction Requirement mailed Aug. 30, 2007", 5 pgs.

"U.S. Appl. No. 10/662,125, Decision on Appeal mailed Oct. 24, 2012", 15 pgs.

"U.S. Appl. No. 10/662,125, Final Office Action mailed Jul. 23, 2008", 23 pgs.

"U.S. Appl. No. 10/662,125, Notice of Allowance mailed Jan. 8, 2013", 8 pgs.

"U.S. Appl. No. 10/662,125, PTO Response to 312 Communication mailed Feb. 28, 2013", 1 pg.

"U.S. Appl. No. 10/662,125, response filed 313, 2008 to Non-Final Office Action mailed Jul. 23, 2008", 18 pgs.

"U.S. Appl. No. 10/662,125, Response filed Dec. 29, 2008 to Final Office Action mailed Jul. 23, 2008", 38 pgs.

"U.S. Appl. No. 10/662,125, Response filed Feb. 20, 2012 to Notice of Allowance mailed Jan. 8, 2013", 8 pgs.

"U.S. Appl. No. 10/662,125, Response filed Apr. 10, 2008 to Non-Final Office Action mailed Jan. 10, 2008", 16 pgs.

"U.S. Appl. No. 10/662,125, Non-Final Office Action mailed Jan. 10, 2008", 19 pgs.

"Data Profiling the Foundation for Data Management", DataFlux Corporation, (Jul. 1, 2004), 18 pgs.

"European Application Serial No. 03794020.2, Office Action mailed Mar. 12, 2010", 5 pgs.

"SyncML Protocol, Version 1,0", Internet Citation, XP002217356, (Dec. 7, 2000), 60 pgs.

Berndtsson, et al., "Task Sharing Among Agents Using Reactive Rules", Cooperative Operation Systems, Proceedings of the Second IFCIS International, (Jun. 24, 1997), 56-65.

Bertino, Elisa, et al., "Data Security", Proceedings of the Twenty-Second Annual International Computer Software and Applications

(56) References Cited

OTHER PUBLICATIONS

Conference, Vienna, Austria, Aug. 19-21, 1998 & Los Alamitos, CA, USA, Aug. 19, 1998, (CompSAC '98), XP010305455, (Aug. 19, 1998), 228-237.

Bon, M., et al., "Sharing Product Data Among Heterogeneous Workflow Environments", CAD 2002: Corporate Engineering Research, German Informatics Society, Mar. 4-5, 2002, Dresden, Germany, XP002268575, (Mar. 4, 2002), 1-10.

Bon, M., et al., "Sharing Product Data Among Heterogenous Workflow Environments", CAD 2002: Corporate Engineering Research, Geman Informatics Society, Dresden, Germany, XP002268575, (Mar. 4, 2002), 1-10.

Chan, Yumman, et al., "Designing Multinational Online Stores: Challenges, Implementation Techniques and Experience", IBM Center of Advanced Studies Conference: Proceedings of the 2000 conference of the center for Advanced Studies on Collaborative research, Mississauga, Ontario, Canada, (2000), 1-14.

Chandramouli, Ramaswamy, "Application of XML Tools for Enterprise-Wide RBAC Implementation Tasks", Proceedings of the 5th ACM Workshop on Role-Based Access Control, Berlin, Germany, XP000958089, (Jul. 26, 2000), 11-18.

Chaudhuri, Surajit, et al., "An Overview of Data Warehousing and OLAP Technology", SIGMOD Record, New York, NY, USA, vol. 26(1), XP002193792, ISSN 0163-5808, (Mar. 1997), 65-74.

Choi, Jin Oh, et al., "Update Propagation of Replicated Data in Distributed Spatial Databases", Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, (Aug. 30, 1999), 952-963.

Chou, H-T., et al., "Versions and Change Notification in an Object-Oriented Database System", Proceedings of the Design Automation Conference, Anaheim, Jun. 12-15, 1988, Proceedings of the Design Automation Conference (DAC), New York, XP010013006, ISBN: 0-8186-0864-1, IEEE, US, vol. CONF. 25, (Jun. 12, 1988), 275-281.

Ferreira, Rezende Fernando De, et al., "A Lock Method for KBMSs Using Abstraction Relationships' Semantics", Proceedings of the International Conference on Information and Knowledge Management, CIKM, ACM, New York, NY, USA,, XP002943684, (1994), 112-121.

Garcia, et al., "Immunization Registries DeDuplication and Record Matching", White Paper, (1999), 1-11.

Georgakopoulos, et al., "An Overview of Workflow Management: From Process Modeling to Workflow Automation Infrastructure", Distributed and Parallel Databases, vol. 3(2), (1995), 119-153.

Haerder, T., et al., "Integritaetskontrolle", Datenbanken Konzepte und Techniken Der Implementierung. XP002294581 [translation provided], (1999), 397-405.

Haerder, T., et al., "RX—Sperrverfahren", Datenbanken Konzepte und Techniken Der Inplementierung, XP002294552 (Translation Provided), (1999), 419-420.

Hill, et al., "Data Transformation: Key to Information Sharing", Gartner Group Strategic Analysis Report, (Sep. 29, 1998), 1-60.

Hong, Bonghee, et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, XP000011783, (Aug. 25, 1987), 142-146.

Kamita, T , et al., "A Database Architecture and Version Control for Group Work", System Sciences, 1994, Vol. III : Information Systems: Decision Support Systems and Knowledge-Based Systems, Proceedings of the Twenty-Seventh Hawaii International Conference on Wailea, HI, US, Jan. 4-7, 1994, Los Alamitos, CA, US, IEEE Comput. Soc., XP010097053, ISBN: 0-8186-5070-2, (Jan. 4, 1994), 438-447.

Linthicum, D. S, "Enterprise Application Integration", Chapter 1(Defining EAI), Chapter 2 (Data-Level EAI): Chapter 9 (RPC's,Messaging,and EAI); Chapter 18 (Message Brokers-Preferred EAI Engine), (May 1, 2000).

Rahm, Erhard, et al., "Data Cleaning: Problems and Current Approaches", IEEE Bulletin of the Technical Committee on Data Engineering, vol. 23(4), http://lips.informatik.uni-leipzig.de:80/pub/2000-45, XP002284896, (Dec. 2000), 11 pgs.

Rana, S P, et al., "Version Support for Manufacturing Database Systems", International Conference on Industrial & Engineering Applications of Artificial Intelligence & Expert Systems, Tullahoma, IN, US New York, US, vol. 2, XP000605772, (Jun. 6, 1989), 779-784.

Sheth, Amit P, et al., "Federated Database Systems for Managing Distributed, Heterogeneous, and Antonomous Databases", ACM Computing Surveys, 22(3), (1990), 184-236.

\* cited by examiner

DYNAMIC ACCESS OF DATA

CROSS-REFERENCE TO RELATED APPLICATIONS

This application is a continuation of U.S. patent application Ser. No. 10/662,125 filed Sep. 12, 2003, which is a continuation-in-part of U.S. patent application Ser. No. 10/365,672, filed Feb. 12, 2003, titled "Dynamic Access of Data," and claims priority to U.S. Provisional Patent Application Ser. No. 60/419,292, filed Oct. 16, 2002, titled "Architecture for Dynamic Master Data Access," U.S. Provisional Patent Application Ser. No. 60/447,556, filed Feb. 13, 2003, titled "Dynamic Master Data Access." Each of the above-referenced Applications is incorporated herein by reference.

TECHNICAL FIELD

The present invention relates to master data access.

BACKGROUND OF THE INVENTION

In a heterogeneous information technology environment, different computer systems may be used within an organization or across different organizations to perform processes on shared master data. For example, a system within a company and a system belonging to an affiliated company may share information about customer and product information. A system for managing customer relationships and a system for managing product production may share common information. The master data shared by different systems may be stored in different locations, and may be in incompatible formats. Each system that accesses master data may be developed independently, and may have its own user interface, data storage, and processes for processing the master data. Each system may be designed to optimize its performance to handle particular tasks.

In one example, the master data are stored in main databases maintained by server computers, which provide the master data to client computers. The client computers have local databases to store data that is accessed locally. The master data includes data objects, such as customer objects or product objects, that have attributes to describe various aspects of the entity (e.g., customer or product) represented by the data objects. Some attributes of the customer object or product object are local while some attributes are global The local attributes are stored in databases local to each client computer, while the global attributes are replicated asynchronously to different databases (e.g., the main databases and/or databases that are local to different client computers) periodically or at certain trigger points. After the global attributes are replicated to various databases, the systems may access customer data and product data stored in local databases using local application programming interfaces. When the number of different systems is large, replicating data across the various systems may requires a long period of time. It is possible that one client system is accessing customer or product data that has been updated, while another client system is accessing data that has not yet been updated.

SUMMARY OF THE INVENTION

In a general aspect, the invention features a system in which compatible and incompatible client systems are able to dynamically access master data stored in a master database maintained by a master data server. An integration server communicates with the client systems and the master data server, and in response to a request for data from a client system, maps the master data in the master database based on a set of mapping rules associated with the client system, and sends the mapped data to the client system.

In general, in one aspect, the invention features a system that includes a master data server and an integration server. The master data server maintains a master database storing master data objects and uses master identifiers to identify the master data objects, the master database being accessible to clients. The integration server, in response to a request from a client to access master data identified by a client identifier, maps the client identifier to a master identifier, retrieves a master data object from the master database based on the master identifier, and maps the master data object to a mapped data object based on a set of mapping rules associated with the client.

This and other aspects of the invention may include one or more of the following features.

At least two clients use different client identifiers to identify a common master data object.

The system includes a mapping table to store information related to the mapping of the client identifiers to the master identifiers.

The system includes a mapping table to store mapping rules associated with the clients.

The master data object has a plurality of attributes associated with characteristics of an entity represented by the master data object, and mapping the master data object to the mapped data object includes retrieving a subset of the attributes from the master data object and formatting the subset of attributes based on rules defined by the client.

The integration server dynamically maps the master data object in the master database to the mapped data object based on mapping rules defined by the client each time the client requests for the master data without replicating the master data object at a database local to the client.

The integration server includes a cache to store master data objects that are requested by clients, and to provide stored master data objects to clients when the integration server receives requests that are identical to previous requests for access to the master data objects.

The integration server includes an exchange interface that receives data that are published by a first client, and routes the published data to a second client that requested the published data.

The integration server maps the data published by the first client to master data based on a first set of mapping rules associated with the first client, and maps the master data to mapped data that can be processed by the second client based on a second set of mapping rules associated with the second client.

The integration server includes a content integrator that finds characteristics that at least two clients associate with an object.

The integration server includes an adapter that receives communications from a client and extracts master data from the communications and forwards the extracted master data to the master data server.

The master data server sends master data objects requested by the clients to the clients without performing client authorization checks.

The client performs authorization checks to limit access to the master data objects by users.

The master data server performs authorization checks to limit access to the master data objects by users.

The client performs authorization checks to limit access to the master data objects by processes running on the client.

The master data server provides processes to allow the clients to modify the master data.

A portion of the master data objects are associated with products.

A portion of the master data objects are associated with business partners.

In general, in another aspect, the invention features a system that includes a master data server and an integration server. The master data server maintains a master database storing master data objects, each object having a set of attributes, the master database being accessible to clients, each client processing a subset of attributes of the master data objects. The integration server, in response to a request from any one of the clients to access a master data object, retrieves the master data object from the master database and maps the master data object to a mapped data object based on a set of mapping rules associated with the client so that the mapped data object contains the subset of attributes in a format that can be processed by the client.

In another general aspect, the invention features a method that includes maintaining a master database at a data server, where the master database contains master data objects and is accessible to clients. The method includes receiving a request from a client to access master data, the request containing a client identifier, and mapping the client identifier to a master identifier. The method includes retrieving a master data object based on the master identifier, mapping the master data object to a mapped data object based on a set of mapping rules associated with the client, and sending the mapped data object to the client.

This and other aspects of the invention may include one or more of the following features.

The method includes receiving a request from the client to modify the master data object to create a modified master data object, and querying other clients to verify that the modified master data object conforms to consistency rules defined by the other clients.

The method includes, if a particular client does not respond to the query as to whether the modified master data object conforms to consistency rules defined by the particular client, placing the particular client on an exception list to indicate that the modified master data object has not been verified to conform with the set of consistency rules defined by the particular client.

The method includes, after a predefined period of time or when the particular client attempts to access data in the database, performing another attempt to verify whether the modified master data object conforms to the consistency rules defined by the particular client.

The method includes receiving a request from the client to delete the master data object from the master database, querying the other clients to verify that the master data object is not used by the other clients, and deleting the master data object from the master database after confirming the master data object is not used by the other clients.

The method includes storing a master data object in a cache, and retrieving the master data object from the cache rather than from the master database when a request for access to the master data object is identical to a previous request.

The method includes modifying the master data objects in the master database, and modifying the mapping rules to allow the clients to process modified master data objects without making modifications at the client.

Each master data object has attributes, each client processes a subset of the attributes, different clients process different subsets of the attributes, and the mapping rules associated with a client define which subset of attributes are processed by the client.

In general, in another aspect, the invention features a method for maintaining data, including providing a master database having master data shared by at least two clients, providing an interface for updating the master database, providing an interface for mapping subsets of the master data into mapped data having a format that is acceptable to each client, and providing a user interface for entering and displaying subsets of the master data.

This and other aspects of the invention may include one or more of the following features.

The method includes providing an exchange infrastructure that receives published data, published by a client, and routes the published data to another client that has requested the published data.

The method includes providing a content integrator to find characteristics that a first client and a second client commonly associate with an object.

The method includes receiving updates of the characteristics for an object from the first client, mapping the updates from a format acceptable to the first client to a format acceptable to the master database, mapping the updates from a format acceptable to the master database to a format acceptable to the second client, and sending the updates to the second client.

The method includes providing a content integrator to find characteristics that at least two clients associate with an object.

The method includes dynamically mapping the data in the master database to mapped data having a format conforming to rules defined by the client each time the client requests for data without replicating data stored in the master database to a database local to the client.

The method includes receiving updates of the characteristics for an object from either one of the first and second clients, and sending the updates to the other of the first and second clients.

In general, in another aspect, the invention features a method for maintaining data, the method includes receiving a first identifier used by a first client to identify a data object, and a request to delete the data object, the data object being stored in a database maintained by a data server, the database being accessible to the first client and a second client. The method includes mapping the first identifier to a second identifier used by the second client to identify the data object, mapping the first identifier to a third identifier used by the data server to identify the data object, and querying the second client based on the second identifier to determine whether the second client is using the data object. The method includes, if the second client is not using the data object, deleting the data object from the database based on the third identifier.

This and other aspects of the invention may include one or more of the following features.

Querying the second client includes determining whether there is any reference to the data object in processes running on the second client and whether there is any reference to the data object in data buffers of the second client.

The method includes querying the second client to determine whether the second client objects to deletion of the data object, and preventing deletion of the data object if the second client objects.

The data object has a plurality of attributes, the first client configured to access a first subset of the attributes, the second client configured to access a second subset of the attributes, the second subset being different from the first subset.

In another general aspect, the invention features a method that includes receiving a first set of communications from a first client, analyzing the first set of communications to find a set of characteristics that the first client associates with a data object used in the first set of communications, and analyzing other communications received from clients to find additional sets of characteristics that clients associate with data objects that have the same characteristics as the first set of characteristics. The method includes placing the first client and clients who sent a set of characteristics that are the same as the first set of characteristics into a client group, and generating a data distribution path to allow updates of the set of characteristics to be sent to the client group.

In general, in another aspect, the invention features a computer program product, tangibly stored on a machine-readable medium, for access of master data. The computer program product includes instructions operable to cause a programmable processor to maintain a master database at a data server, the master database containing master data objects, the master database accessible to clients. The computer program product includes instructions operable to cause the programmable processor to receive a request from a client to access master data, the request containing a client identifier, map the client identifier to a master identifier, retrieve a master data object based on the master identifier, map the master data object to a mapped data object based on a set of mapping rules associated with the client, and send the mapped data object to the client.

In general, in another aspect, the invention features a computer program product, tangibly stored on a machine-readable medium, for access of master data. The computer program product includes instructions operable to cause a programmable processor to maintain a master database having master data shared by at least two clients, provide an interface for updating the master database, provide an interface for mapping subsets of the master data into mapped data having a format that is acceptable to each client, and provide a user interface for entering and displaying subsets of the master data.

In general, in another aspect, the invention features a computer program product, tangibly stored on a machine-readable medium, for access of master data. The computer program product includes instructions operable to cause a programmable processor to receive a first identifier used by a first client to identify a data object, and a request to delete the data object, the data object being stored in a database maintained by a data server, the database being accessible to the first client and a second client. The computer program product includes instructions operable to cause the programmable processor to map the first identifier to a second identifier used by the second client to identify the data object, map the first identifier to a third identifier used by the data server to identify the data object, query the second client based on the second identifier to determine whether the second client is using the data object; and if the second client is not using the data object, delete the data object from the database based on the third identifier.

In general, in another aspect, the invention features a computer program product, tangibly stored on a machine-readable medium, for access of master data. The computer program product includes instructions operable to cause a programmable processor to receive a first set of communications from a first client, analyze the first set of communications to find a set of characteristics that the first client associates with a data object used in the first set of communications, and analyze other communications received from clients to find additional sets of characteristics that clients associate with data objects that are the same characteristics as the first set of characteristics. The computer program product includes instructions operable to cause the programmable processor to place the first client and clients who sent a set of characteristics that are the same as the first set of characteristics into a client group, and generate a data distribution path so that the programmable processor can route updates of the set of characteristics to the client group.

In general, in another aspect, the invention features a computer program product, tangibly stored on a machine-readable medium, for access of master data. The computer program product includes instructions operable to cause a programmable processor to associate master data with an object, send the master data to a master data server that stores master data associated with the object on a database, and access master data associated with objects on the database by requesting an integration server that communicates with the programmable processor and the master data server map the data in the data server to a mapped data set that has a format conforming to rules defined by the programmable processor and send the mapped data set to the programmable processor.

This and other aspects of the invention may include one or more of the following features.

The integration server communicates with the programmable processor and the master data server dynamically to allow the programmable processor to dynamically access the master data without replicating the master data locally.

The programmable processor sends a set of data to an exchange infrastructure that sends the set of data to another programmable processor that has requested the set of data.

The programmable processor sends characteristics that it associates with a data object to a content integrator, which finds other programmable processors that associate the characteristics with the data object.

The programmable processor sends communications to an adapter that extracts master data from the communications and forwards the extracted master data to the master data server.

The master data server sends all data requested by the programmable processor to the programmable processor without performing programmable processor authorization checks.

The programmable processor can modify the master data stored in the master data server.

An advantage of a system having the master data server and the integration server is that the integration server performs necessary mapping of data objects so that a client may use identifiers having a format that is not acceptable to another client. Another advantage is that the master data server and the clients may be modified independently. The master data sever is extensible and stores attributes required by different clients that are integrated to the system at different times.

Another advantage is that the system can be set up in a small amount of time without a large modification of the existing clients. The integration server provides a communication tool for interfacing with existing clients, and performs the necessary translations and mappings. Different clients can be integrated into the system at different times, allowing greater flexibility in managing the system. Another advantage is that little or no code has to be added on the clients or the master data server when the clients are integrated into the system, since mapping rules are maintained and stored on the integration server.

The details of one or more implementations of the invention are set forth in the accompanying drawings and the

DETAILED DESCRIPTION

Figure 1:
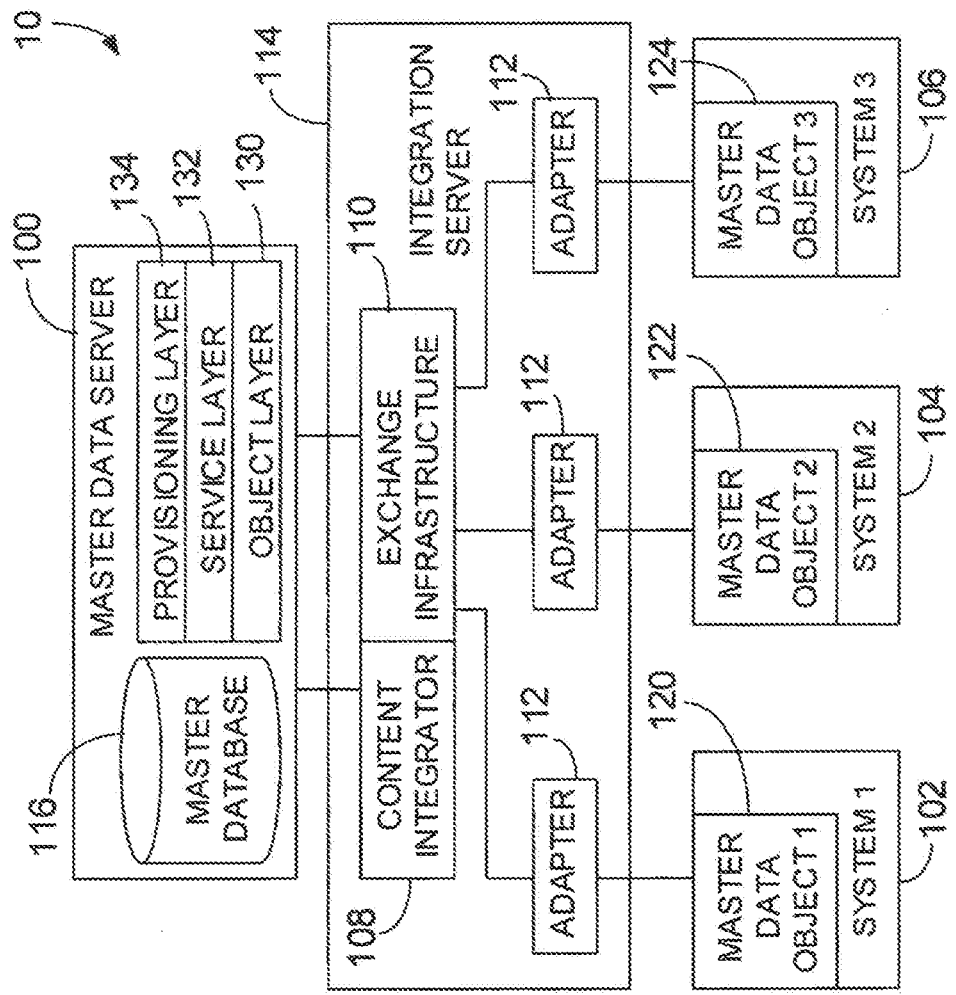
FIG. 1 shows client systems interacting with a master data server through an integration server.

Referring to FIG. 1, a heterogeneous information technology (IT) system 10 includes a master data server 100 that allows users to store, augment, and consolidate master data, and to distribute consistently the master data to client systems 102, 104, and 106. The master data are stored in a master database 116. An integration server 114 is used as a communication interface between master data server 100 and the client systems 102-106. Integration server 114 includes a content integrator 108 for consolidating master data and an exchange infrastructure (interface) 110 for exchanging and distributing the master data.

Client systems 102-106 can be different computer systems. Client systems 102-106 can also be different application programs that access and manipulate different aspects of master data objects. Different client systems may belong to different companies, each having different access privileges for accessing the master data. The master data objects created by client systems 102-106 may have different formats (e.g., different fields) even when the data objects represent the same underlying entities or physical objects (e.g., customers, products).

Master data server 100 is configured as a central processing unit for processing master data. Master data server 100 consolidates and harmonizes the master data to eliminate redundant, irrelevant, and/or incorrect data. Heterogeneous IT system 10 is designed so that the master data can be produced and maintained from either the master data server 100 or client systems 102-106.

Exchange infrastructure 110 cooperates with master data server 100 to allow client systems 102-106 to access master data dynamically. The term "dynamic" means that processes running in client systems can access information stored at master data server 100 whenever the processes need the information without having to store data locally at the client side. The processes may be batch processes running in the background, or processes adapted to allow users to access, view, and maintain master data. Different processes may require different data formats, and data transferred between the client systems and master data server 100 are mapped dynamically from one format to another, depending on how the systems are configured. Each client system may be configured independently of the other systems, and each system may view and process the master data differently.

Exchange infrastructure 110 assists communication between master data server 100 and client systems 102-106. Exchange infrastructure 110 dynamically maps data so as to conform to data formats defined by the master data server 100 and each client system. By dynamically mapping data, exchange infrastructure 102 allows additional client systems to be easily integrated into heterogeneous IT system 10. When a new client system is integrated into heterogeneous IT system 10, the exchange infrastructure 110 is adjusted so that it recognizes the data format required by the new client system. Without the exchange infrastructure, the new client system would have to connect directly to each of the existing client systems, and each existing client system would have to adjust to the new client system, which would require more time and effort.

Each client system 102-106 modifies and retrieves master data through exchange infrastructure 110. Client systems 102-106 communicate with exchange infrastructure 110 using messages based on open protocols, such as hyper text transfer protocol (HTTP), extensible markup language (XML), and extensible stylesheet language (XSL). Each client system dynamically may access the master data whenever it needs information.

The term "master data" in general refers to data that does not vary significantly from one transaction to another, whereas the term "process data" in general refers to transaction-specific data. For example, an application may process data related to purchases of car components, which may include vehicle head lights. Data related to a particular head light model purchased within a specified season are likely to remain the same, with perhaps minor changes. Such data can be considered as master data. Data related to the purchase orders of the head lights (e.g., purchase price and purchase date) varies from one transaction to the next. Such data can be considered as process data. Which data are classified as master data and which data are classified as process data may be determined by a system administrator of system 10. In one example, the process data are stored at the client systems and not stored in the master database 116.

In one version of system 10, client systems 102-106 do not locally maintain copies of master data, and dynamically access master data in master database 116. When client systems 102-106 modify master data, the modifications are performed on the master data in master database 116. When one client system updates master data, the updates are available to other client systems, since all client systems access the same master database 116.

In another version of system 10, each client system maintains local copies of some or all of the master data. The master data are distributed to client systems through exchange infrastructure 110 based on a "publish and subscribe" model. A client system may "publish" an updated master data object, and request that the updated master data object be integrated into master database 116. A client systems may "subscribe" to certain types of master data and receive those types of master data when they are published by another client system. A client system may request that updates of master data be distributed to the client system periodically or upon specified trigger points. The exchange infrastructure 110 stores routing rules that contain information on how messages relating to master data should be routed. The routing rules include information on which systems are interested in which types of master data. Routing rules may be based on the content of the messages. For example, a routing rule may specify that messages including information on a certain customer or product should be routed to certain client systems.

In both versions of system 10 described above, mappings of the messages are carried out by the exchange infrastructure 110 when necessary. The mappings include structural conversions and value mappings. Structural conversions are used for semantically equivalent types that are syntactically or structurally different. Value mappings are used when an object is identified by different keys (or identifiers) in multiple systems. For each master data object in master database 116, master data server 100 uses an identifier (referred to as a "master identifier") to identify the master data object. Each client system uses an identifier (referred to as a "client identifier") to identify the master data object. Different client systems may use different client identifiers to identify the same master data object.

As an example, master data server 100 uses an identifier, such as "vehicle 123-abc," to identify a master data object having information related to a car product. The identifier "vehicle 123-abc" is known to master data server 100 and exchange infrastructure 110, but not necessarily known to client systems. The master data object has three attributes associated with characteristics of the car product. The attributes are stored in a table having three entries. The first entry specifies the engine type, the second entry specifies the body paint type, and the third entry specifies the wheel type.

As an example, client system 102 is designed to process master data related to engines and wheels, and does not process master data related to body paint. Within client system 102, an identifier "car 123" is used to identify the data object having information related to the car product. The data object has two attributes stored in a table having two entries, the first entry specifying the engine type, and the second entry specifying the wheel type. The identifier "car 123" is known to client system 102 and exchange infrastructure 110, but not necessarily known to master data server 100 or other client systems.

As an example, client system 104 is designed to process master data related to wheels and body paint, and does not process master data related to engines. Within client system 104, an identifier "vehicle abc") is used to identify the data object having information related to the car product. The data object has two attributes stored in a table having two entries, the first entry specifying the wheel type, and the second entry specifying the body paint type. The identifier "vehicle abc" is known to client system 104 and exchange infrastructure 110, but not necessarily known to master data server 100 or client system 102.

Exchange infrastructure 110 stores mapping rules indicating how master data object "vehicle 123-abc" should be mapped to "car 123" or "vehicle abc," and vice versa. For example, when client system 102 attempts to access master data using identifier "car 123," integration server 114 looks up a mapping table, determines that "car 123" of client system 102 is mapped to "vehicle 123-abc" of master data server 100, and retrieves data object "vehicle 123-abc" from master database 116. The mapping table may be stored in content integrator 108. Integration server 114 creates an instance of a data object (identified by identifier "car 123") having a table with two entries, maps the first entry of data object "vehicle 123-abc" to the first entry of data object "car 123," and maps the third entry of the data object "vehicle 123-abc" to the second entry of data object "car 123." When client system 102 makes changes to the second entry (relating to wheels) of data object "car 123," integration server 114 sends a message to master data server 100 to make corresponding changes to the third entry of data object "vehicle 123-abc" in master database 116.

Similarly, when client system 104 attempts to access master data using identifier "vehicle abc," integration server 114 looks up the mapping table, determines that "vehicle abc" of client system 104 is mapped to "vehicle 123-abc" of master data server 100, and retrieves data object "vehicle 123-abc" from master database 116. Integration server 114 creates an instance of a data object (identified by identifier "vehicle abc") having a table with two entries, maps the third entry of data object "vehicle 123-abc" to the first entry of data object "vehicle abc," and maps the second entry of the data object "vehicle 123-abc" to the second entry of data object "vehicle abc." When client system 104 makes changes to the first entry (relating to wheels) of data object "vehicle abc," integration server 114 sends a message to master data server 100 to makes corresponding changes to the third entry of data object "vehicle 123-abc" in master database 116.

Other types of mappings may be performed, such as converting measurement units, currencies, and terminology (different clients may use different terms to describe the same attribute).

Thus, client systems 102 and 104 each can use its own identifier and format to retrieve, process, and modify master data. Client systems 102 and 104 do not need to know how the other client system identifies and processes car product master data. Integration server 114 performs the necessary mappings between data objects used by master data server 100 and client systems 102 and 104. Integration server 114 also performs consistency checks, as described in more detail below, to ensure that when a client system attempts to modify master data objects, the modification is consistent with rules specified by other client systems.

An advantage of using integration server 114 to perform necessary mapping is that a client system may use identifiers having a format that is not acceptable to another client system. For example, client system 102 may require that identifiers for product master data consist only of numbers, while client system 104 may require that identifiers for product master data consist only of alphabets. Without integration server 114, it would be difficult to integrate client systems 102 and 104 since they have incompatible requirements on how to name the identifiers of master data objects.

Another advantage is that the master data server 100 and the client systems may be modified independently. The architecture for dynamic master data access described above allows the master data sever 100 to be "extensible," meaning that the master data server 100 can store attributes required by different clients that are integrated into heterogeneous IT system 10 at different times. For example, client system 106 may process master data related to car frames. When client system 106 is integrated into system 10, the master data server 100 may modify its format for master data objects related to car products so that the data object "vehicle 123-abc" has a table with four entries: the first entry specifying the car frame type, the second entry specifying the engine type, the third entry specifying the wheel type, and the fourth entry specifying the body paint. A corresponding change is made at the mapping table of integration server 114 so that the second and third entries of "vehicle 123-abc" are mapped to the first and second entries of "car 123," respectively. Likewise, the third and fourth entries of "vehicle 123-abc" are mapped to the first and second entries of "vehicle abc," respectively Client systems 102 and 104 do not have to be modified and can still operate smoothly as before.

The exchange infrastructure 110 contains a queuing mechanism to provide consistent delivery of messages. When messages are not successfully delivered, they are queued for later delivery, preventing messages from being lost. Because undelivered messages are queued, the sender does not have to resend the messages, thus preventing duplicate messages from being sent to the target system.

Content Integrator

Content integrator 108 consolidates master data objects from different client systems. The consolidated master data objects are stored in the master database 116. As an example, client systems 102 and 104 may both have master data related to a particular customer or product. The information may be entered independently by the client systems. Some master data may overlap and be redundant, and some master data may be inconsistent. To allow the master data to be used efficiently and correctly throughout the heterogeneous IT system 10, the master data from different client systems is consolidated to remove redundancy and to resolve inconsistency before it is stored in master database 116.

To consolidate the master data, a user determines matching rules that are used to match master data objects. Content integrator 108 identifies different data object types created by different client systems by matching characteristics of the data objects with the matching rules. When content integrator 108 finds duplicate master data objects, the redundant master data objects are removed.

Consolidation of master data is used during a master data creation process and a master data change processes. Master data creation process refers to creating a new master data object in master database 116 based on master data provided by client systems. Master data change process refers to modifying a master data object already existent in master database 116. By performing consolidation during each change process, the master data objects in master database 116 can be free of duplicates and inconsistencies as the master data are continually updated over time.

One method of consolidating master data is to use identifiers of data objects. For example, client systems 102, 104, and 106 create master data objects 120, 122, and 124, respectively, that are related to products. Master data objects 120 and 122 are related to a product having an identifier 4711. Master data object 124 is related to a product having an identifier 4712. Before the master data objects 120, 122, and 124 are stored into master database 116, content integrator 108 examines master data objects 120-124 for consistency. Content integrator 108 compares the identifiers, and discovers that data objects 120 and 122 have the same identifier, and thus examines further to determine whether there are redundant fields or inconsistencies between data objects 120 and 122. After data objects 120 and 122 are reconciled, data objects 120 and 122 are reconciled with data objects stored in master database 116 that are related to product 4711, and data object 124 is reconciled with data objects in master database 116 that are related to product 4712.

Content integrator 108 stores rules on mapping data objects from client systems to data objects in master database 116. For example, after the consolidation process, content integrator 108 has information indicating that client system 102 stores data objects related to product 4711 in a certain format, and that a particular mapping should be used to map such data objects to the format used by master database 116. Similarly, content integrator 108 knows what mapping should be used when data objects related to product 4711 are retrieved from master database 116 and sent to client system 102.

The mapping information can be used for distribution of master data. When one client system wants to distribute master data, it creates a master data object, which is mapped to a format accepted by master database 116, which in turn is mapped to a format acceptable by each recipient of the master data. Such mapping information is also used by cross-system reporting and analysis applications.

Content integrator 108 supports cross-system searches of master data objects. As an example, client system 102 may be used to manage products received from vendors and generate master data objects related to those products. Client system 102 may also store information related to delivery of the products, such as who the vendor is and when the delivery was made. The delivery information is process data, is particular to client system 102, and is not stored in master database 116.

Suppose a user of client system 104 wants to find master data that is related to a particular operation, e.g., search for products that have been delivered by a particular vendor. Since the deliveries are not known to the master data server 100, the master server 100 cannot execute such a search. Client system 102 can execute the search since it has delivery information. Thus, client system 104 sends a request to client system 102 through content integrator 108 to conduct a search for products delivered by the particular vendor. Client system 102 returns a "where-used" list with the system locations of the respective master data objects. The data objects are mapped by content integrator 108 into a format recognized by client system 104. Based on the search result, content integrator 108 may retrieve data objects from master database 116 and map the data objects to a format acceptable by client system 104, and display the attributes of the data objects required by client system 104.

An example of a process that uses a where-used list is a batch job that finds which sales orders or service orders related to given business partners are outstanding or delayed, and sends reminder mailings to those business partners.

Master data server 100 includes three layers: (1) an object layer 130, (2) a service layer 132, and (3) a provisioning layer 134. The object layer 130 describes master data objects in a flexible and extensible way, and makes the master data objects available to the content integrator 108 and exchange infrastructure 110 for further processing. The object layer 130 provides predefined master data object types that can be enhanced by individual applications running at client systems.

The service layer 132 provides the methods for manipulating the master data objects (such as creation or change), as well as generic services for processing the master data. If necessary, service layer 132 provides the generic services as Web services that can be accessed through a network. Examples of generic services include change management, versioning, and status management.

The provisioning layer 134 controls distribution of the master data in cooperation with the exchange infrastructure 110. The data objects can be individually selected and distributed. The data objects can also be selected and grouped together based on system-wide overall business context and distributed together as a group. Information concerning links among the data objects and the overall structure of the group of data objects is also distributed. For example, product A and product B may both have a relationship with vendor C. A client system may want to find all product made of a particular material and are provided by vendor C and purchased in a particular month. Gathering such information requires data about the products themselves, as well as the business context (in this case, the vendors and the purchase date). The compiled master data objects are distributed through the exchange infrastructure 110. The exchange infrastructure 110 provides subscription functions that allow a client system to specify the overall business context of the master data objects that it wishes to receive.

Client systems 102-106 and master data server 100 may store the same data object using different data models and formats. For example, client system 102 may store attributes of a product data object in a single table, whereas master data server 100 may store the attributes of the data object in ten tables and use an algorithm to assign a certain attribute to one of the ten tables. Different client systems may support different message formats. For example, some client systems may not be capable of processing and sending XML messages. To allow integration of various client systems into heterogeneous IT system 10, integration server 114 includes technical adapters 112 that provide technical adaptations or translation (mapping) services that allow client systems to access functionalities provided by integration server 114, and to allow integration server 114 to access functionalities provided by the client systems.

For example, a source adapter may be used to receive documents (or tables) from a client system and convert the documents (or tables) into XML messages in a format that can be interpreted by exchange infrastructure 110. The source adapter may also extract portions of the document (or tables) that are relevant to master data and convert the relevant portions into XML messages that are sent to exchange infrastructure 110, A target adapter may be used to receive XML messages from exchange infrastructure 110 and convert the messages into documents (or tables) having a format that can be accepted by target client systems. Adapters 112 may be used to adapt to specific third party applications running on a client system.

The adapters allow the master data server 100 to integrate client systems with less functionality, such as client systems running older versions of applications. As an example, the master data that is distributed to client systems can be enhanced with attributes before the master data are stored persistently in the client systems. Particular rules of the clients' systems concerning production and change of data may be imposed on the master data objects that are distributed to the client systems. To compile and distribute master data objects that match certain criteria, the technical adapter 112 calls search and extraction functions local to the client systems to extract business-relevant data. Technical adapter 112 also calls the services provided by the master data server 100 to search for data objects based on business context. After the search is performed, the technical adapter 112 triggers distribution of the data objects that are found through exchange infrastructure 110.

Master Data Management

Examples of master data include organizational structures, documents, product masters (materials, services, financial products), bills of materials, and cost centers. In managing master data, one goal is to reduce redundancy. For example, when a common product is supplied by two different vendors, two master data objects may be initially created to represent the products supplied by the two vendors. Since the two master data objects actually relate to the same product, they can be consolidated so that master data can be managed more efficiently. Likewise, data objects representing raw materials or parts that are produced in-house, and products that are completed and ready for sale, may also be consolidated. By reducing the number of master data objects to describe the various parts, the costs in storage, procurement, and catalog management can be reduced.

An advantage of the master data server 100 and integration server 114 is that they can be set up in a small amount of time without a large modification of the existing client systems. This is because integration server 114 provides a communication tool for interfacing with existing client systems, and performs the necessary translations and mappings. Master data server 100 can be deployed on an evolutionary basis, i.e., different client systems can be integrated into the heterogeneous IT system 10 one by one, at different times, allowing greater flexibility in managing various systems.

Master data server 100 allows master data to be consolidated without changing the data structures in the client systems. Two client systems may store master data in two different formats, and different client systems may store master data that is redundant of one another. In one example, master data server 100 consolidates the master data in different client systems by using attributes that are common to master data objects stored in different client systems. This allows an association among similar master data objects to be maintained when a change to a master data object is made. This also allows consistent maintenance and distribution of master data objects using attributes that are commonly used by different client systems. Consolidation of master data allows all client systems to be supplied with the same master data, so that business processes can rely on accurate master data. The master data objects that are distributed to each client system can later be augmented with additional attribute values in the client systems.

Master data objects that are related can be changed and distributed together as a group. For example, a data object relating to the structure of a product and a data object related to documents describing the product may be collected together in a single packet and distributed together. When a change is made to the data object relating to the structure of the product, a corresponding change may be made to the data object relating to the documentation of the product.

Master data server 100 decides which master data objects can be grouped together based on business context, and when and where the group of master data objects are distributed. The timing of the distribution may be triggered by events, and the target client systems may be determined based on business context. The attributes of the master data objects that are distributed to client systems can be specifically customized for each client system so that each client system receives only the information that it needs.

Maintenance of master data can be performed on the master data server 100 or on client systems that provide maintenance functionality. Master data server 100 may store a master data object containing information that is used by many processes. An administrator at the master data server 100 may have authority to change all attributes of the master data object, while a user (or an application program) at a client system may have limited authority to change certain attributes of the master data object pertaining to the applications running on the client system.

For example, a client sales program may not have the authorization to view or maintain manufacturing data for a master data object. The client sales program may be limited to maintaining aspects of the master data object relating only to sales data.

Access to Master Data

A client system may access master data by calling a search application programming interface (API) provided by the master data server 100. The search API returns a list of search results, each search result containing a few fields, such as brief descriptions of products. If the client system needs further information about any of the search results, the client system calls a read access API to obtain more detailed information. The search API of the master data server 100 offers a large number of search options to cover different needs by the client systems.

Master data server 100 may provide multiple types of read access APIs. For example, a "get identification" API returns an object's identification and certain descriptive parameters, such as a product name or a business partner name. A "get detail" API returns the detailed information about a data object. A client system can customize the "get detail" API so that the API returns only the attributes that the client system requires. When the master data server 100 uses a different and more general data model as compared to the data model used by the client system, the integration server 114 performs mapping of the data objects from the client systems to the master data server 100, and vice versa.

Delete Process

Since master data objects can be accessed by master data server 100 and client systems 102-106, deletion of master data objects involve a collaborative process between the master data server and the client systems. In one example, master data are deleted by the master data server 100 only and not by the client systems. The client systems can object to the deletions. The deletion process involves a number of steps.

(1) Before a user deletes a master data object, the user determines where this master data object is used (e.g., by generating a where-used list). This information may be provided by a search engine, and a synchronous service may also be used to obtain the most recent result.

(2) The user marks the master data object as no longer being used. This can be done by a status change for the data object.

(3) An archiving process is performed to archive the data object to be deleted.

(4) Physical deletion of the master data object from the master database 116 is performed. Prior to physical deletion, each client system is asked if any reference to the data object exists (either in processes or in any master data buffers), and whether any client system objects to the deletion. If there are no objections, and when all clients have deleted their references to the data object and have informed the master data server 100 that the references for that data object no longer exist, the data object is physically deleted from the master database 116.

The client systems may optionally perform post deletion activities, such as rejecting any read access to the deleted data object from the client systems, and not returning the data object in any searches. Master data server 100 may optionally provide an API with mass data processing capability, such as deleting all objects given in an identifier table.

A client system may provide a master data user interface to display information about a master data object. The master data user interface may be customized to display information most relevant to the processes running on the client system. If the client system does not have a user interface to display the master data, then a user at the client system can navigate to the master data server 100 and use the user interface provided by master data server 100. Combining these two user interfaces can be achieved in a portal environment.

Consistency Checks

Consistency of master data can be checked either when writing or when reading the data. An advantage of checking when reading is that each client system ensures the consistency of the data used by its processes when reading data. An advantage of checking consistency when writing data is that write operations are performed less than write operations, so checking consistency when writing data is more efficient than when reading data. Another advantage of checking consistency when writing data is that the user can be asked to correct the data before they are actually saved and written into the master database.

The following describes a data entry process and a data maintenance process in which consistency of data objects is checked.

Figure 2:
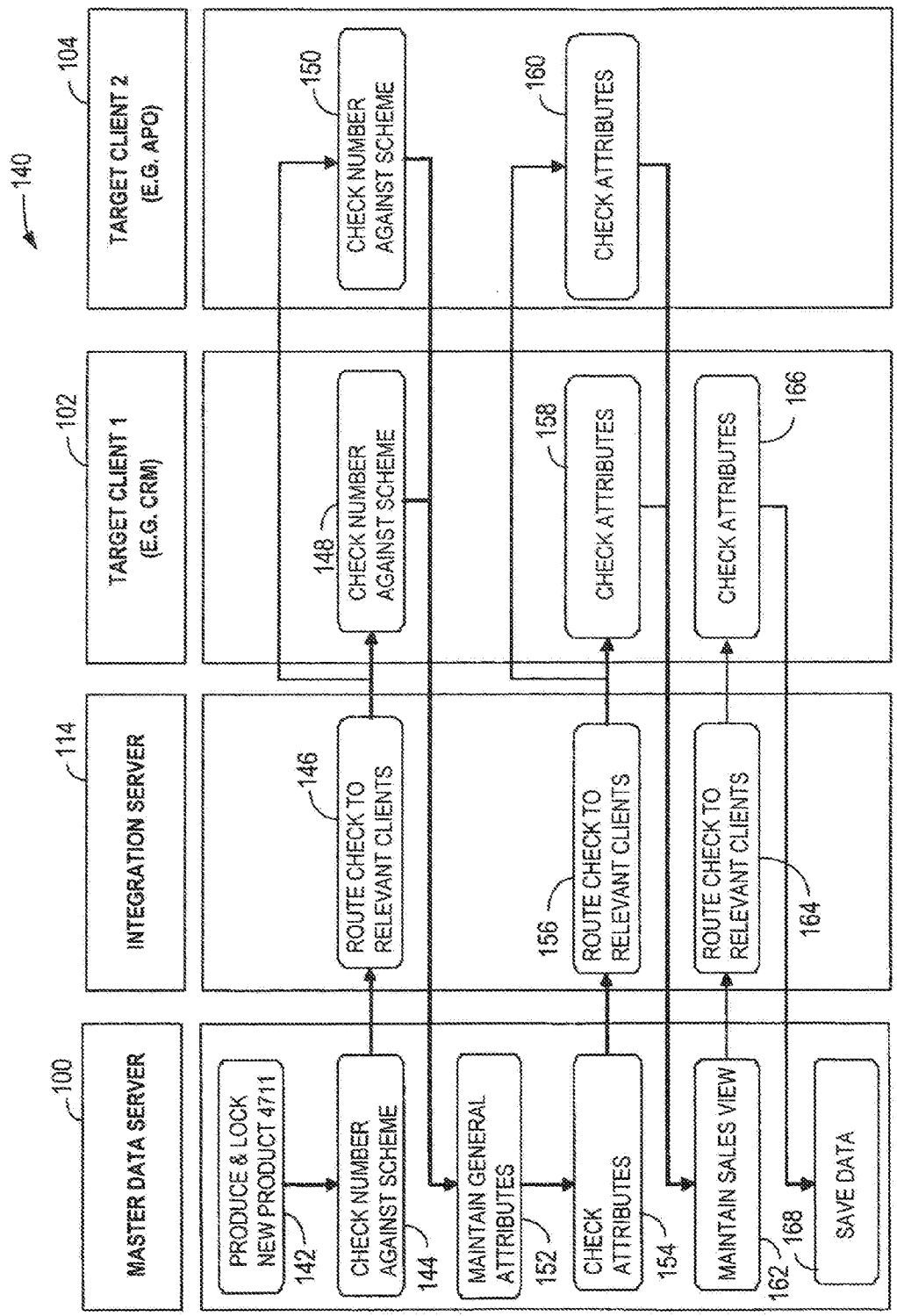
FIGS. 2-4 show processes for verifying consistency of master data.

Referring to FIG. 2, a data entry process 140 is performed when new data are entered into master database 116 by a user through master data server 100. In this example, maintenance of master data is performed on the master data server 100. A client 102 and a client 104 are connected to integration server 114. A user selects a user interface (e.g., a screen) to produce and lock 142 a new entry for a new product. As an example, the user selects a number "4711" to identify the new product. Before the new entry is saved into master database 116, the identifier "4711" is "locked" so that it cannot be used by another user to identify another product. The locking procedure ensures that only one person can create master data related to the identifier "4711."

To ensure that all applications will be able to access the data entered into master database 116 by its identifier, the identifier (i.e., the number "4711") is checked 144 against a scheme that defines the acceptable formats of identifiers. Master data server 100, client system 102, and client system 104 may each have its own scheme that is different from other schemes. For example, master data server 100 may use a scheme that requires the identifier to have less than 10 digits. After the identifier is verified to conform to the scheme required by master data sever 100, a request is sent from master data server 100 to integration server 114 to check the identifier against schemes generated by various client systems.

Integration server 114 has information on which client system can have access to the new data. For example, client 102 and client 104 may both have access to data related to "products." Integration server 114 routes 146 requests for checking the identifier against schemes to relevant clients, which, in this case, are client 102 and client 104. When client 102 receives the request for verifying the identifier, client 102 checks 148 the identifier against its own scheme. If the identifier does not match the scheme, an error message is sent to master data sever 100, indicating that the user has to select another identifier. Likewise, client 104 checks 150 the identifier against its own scheme, and sends an error message to master data server 100 if the identifier does not match the scheme. The checks 144, 148, and 150 ensure that master data server 100, client 102, and client 104 can all access the new data by using identifiers that are valid for each of server 100, client 102, and client 104.

If the format of the identifier has been verified, the user continues to maintain general attributes associated with the product 4711. An attribute can be, for example, a short text description of the product, a base unit of measure, a sales unit of measure, a price of the product, a quantity of the product, planning parameters for a product, or a vendor of the product. General attributes are attributes that are relevant to more than one client.

The user enters attribute values for each attribute, then checks 154 whether the attribute values satisfy consistency rules set for those attributes. For example, a consistency rule may require that, if a new unit of measure is added, it needs to have a conversion factor to existing units of measure. As another example, a consistency rule may require that if a number is used to represent the price of a product, a currency must also be specified.

Master data server 100 sends a request to integration server 114 to request verification of the attribute values. Integration server 114 routes 156 the request to relevant clients. Upon receiving the request, client 102 checks 158 the attribute values against consistency rules defined by client 102, and sends a message to master data server 100 if a violation of the rules occurred. For example, client 102 may define a consistency rule that requires a base unit of measure to accompany a sales unit of measure (for example, if a salesperson sells the product in units of boxes, he needs this unit of measure—box, and additional information as to how many products are in a box). Another consistency rule may require that the price be specified in Euros.

Upon receiving the request for verification of attributes, client 104 checks 160 the attribute values against rules defined by client 104. For example, a consistency rule may require that a production time can only be changed if there is no open planning run (this may be required because, for example, the planning run relies on a constant production time).

After client 102 and client 104 verify that the attributes conform to the rules defined by those clients, a user selects an interface (e.g., a screen) to maintain 162 data that is related to, for example, sales. Attributes related to sales may be relevant only to client 102 and not client 104. Integration server 114 keeps track of what types of attributes are relevant to which client or clients. After the user adds or modifies data relevant to sales, master data server 100 sends a request to integration server 114 to verify that the data conforms to the consistency rules of the clients. Integration server 114 routes 164 the request to a relevant client, which, in this example, is client 102. Upon receiving the request, client 102 checks the data related to sales with consistency rules related to sales data that are defined by client 102. If the data are consistent with the consistency rules, master data server 100 saves 168 the new data into master database 116.

Master data also can be maintained by a user of a client using an interface to implement a maintenance dialog. The interface may be designed so that only the data relevant to the client are displayed and maintained.

Figure 3:
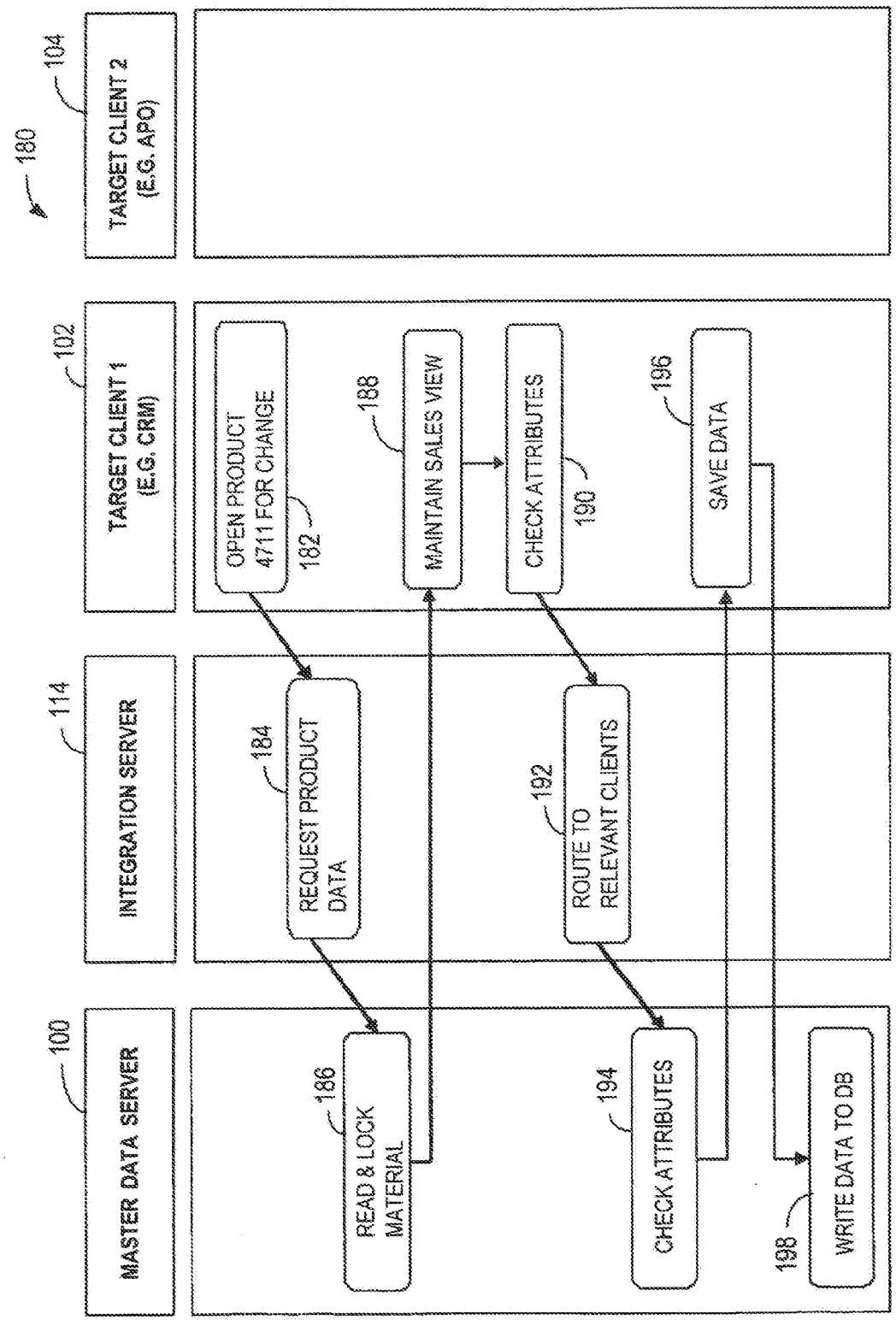

Referring to FIG. 3, a data maintenance process 180 is performed when a client updates data in the master database 116. In this example, client 102 wishes to update data related to product 4711. Client 102 "opens" 182 product 4711, which may mean showing a graphical user interface that allows the user to enter the identifier "product 4711" to identify what data needs to be modified.

Client 102 sends a request to integration server 114, which requests 184 the data from master data server 100. Upon receiving the request, master data server 100 reads and locks 186 data related to product 4711. Locking is done by the master data server 100, regardless of which client changed the data. Master data server 100 needs to know which client is locking the data so that this information can be communicated to another client attempting to access the data. The data are sent to integration server 114, which maps the data into data that has the format of client 102. As an example, client 102 maintains data relevant to sales. Client 102 uses the graphical user interface to display a view that shows only data relevant to sales. The user at client 102 proceeds to maintain 188 (e.g., revises or deletes) data relevant to sales. The updated data are checked 190 for consistency against rules defined by client 102.

The updated data are also checked for consistency against rules defined by other clients and the master data server 100. Client 102 sends a request to integration server 114 to initiate the verification process. Integration server 114 routes 192 the request to the master data server 100 and relevant clients. In this example, because sales data are not relevant to client 104, integration server 114 does not send the request to client 104. Integration server 114 sends the request to master data server 100, which in response to the request, checks 194 the attributes against the consistency rules defined by master data server 100 for consistency. After master data server 100 and other clients send messages indicating that the updated data are consistent with the consistency rules, client 102 saves 196 the data, and sends a message to master data server 100 requesting that the master data server save the updated data into master database 116.

Master data server 100 maintains data required by many applications or processes running on different clients. A client (or a user using the client) maintaining data associated with an object may not be qualified or authorized to modify all of the data, and may maintain only the data for his process (e.g., sales). Integration server 114 is configured so that it is possible for a user to access only a view having data relevant to his process, and thus only have to deal with consistency requirements for this view. The data (and the object associated with the data) that have been maintained can be used for this view (i.e., can be used for processes associated with this view). The data may not be usable in views not yet created (e.g., future planning).

The clients that need to check for consistency are determined by integration server 114. Integration server 114 routes the check request to the clients at runtime and returns the results of each client, either an "okay message" or a collection of messages describing errors in consistency. The errors are displayed to allow the user to modify the data to ensure consistency.

During a consistency check process, if a client does not respond, the client is placed on an exception list, and the check process continues with the remaining clients. This ensures that maintenance of master data is not interrupted due to some failure of a client.

Figure 4:
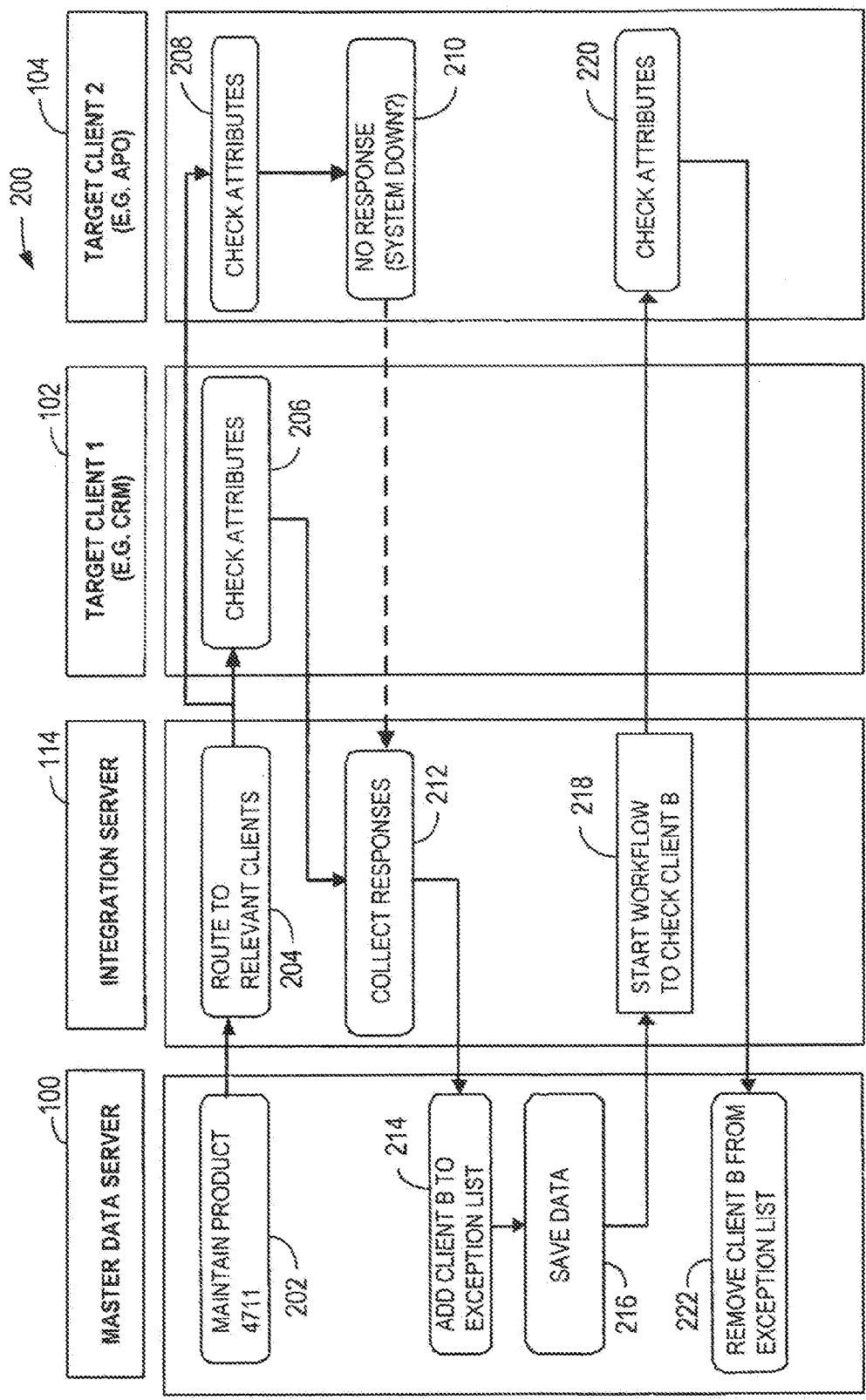

Referring to FIG. 4, a data maintenance process 200 occurs when a client does not respond. Master data sever 100 maintains 202 data associated with product 4711, and sends a request to integration server 114 to check for consistency. Integration server 114 routes 204 the request to relevant clients. Upon receiving the request, client 102 checks 206 the attributes. Client 104, upon receipt of the request, is supposed to check 208 the attributes as well. However, for some reason (e.g., system down), client 104 may not respond 210. Integration server 114 collects 212 all responses from the clients, and discovers that no response has been received from client 104. Integration server 114 sends the responses collected from the clients to master data server 100.

Master data server 100 adds 214 client 104 to an exception list, indicating that client 104 has not confirmed whether the updated data are consistent with the consistency rules required by client 104. Master data server 100 saves 216 the updated data into master database 116, and starts 218 a workflow to check client 104. The workflow may check client 104 manually or automatically after a certain time delay, or to check client 104 upon a trigger event, such as when client 104 sends a read request, signaling that communication with the client is possible. If integration server 114 communicates successfully with client 104, client 104 checks 220 the attributes to verify consistency. Upon receiving confirmation from client 104 that there is no conflict, master data server 100 removes 222 client 104 from the exception list.

Using the approach above, the master data maintenance process is not stalled when a client is not available in the network. Inconsistent data are not passed on to a client. The exception list is used to determine which clients should be temporarily denied access to the object until consistency checks have been completed.

Data generated for an organizational unit may be relevant only to certain clients. If, for example, if planning data are generated for factory A, the data may be needed only by an application (e.g., SAP Advanced Planner and Optimizer, "APO") in factory A and is irrelevant to an APO doing planning in another factory B.

When a new system with new consistency requirements is added to system 10, its data may not be consistent with the master data stored in the master data server 100. System 10 runs a consistency check for all master data before the new system accesses the master data in master database 116.

Some clients may have constraints on master data. For example, client 102 may require the existence of certain data fields, or will only allow data to be within a specified range.

Such requirements may be inconsistent to the format of master data after a system upgrade. By using different versions of data objects, different clients may use different versions of the master data object. New versions of data objects are not yet referenced by any clients, so there are fewer constraints, and data modifications can occur freely. Processes can switch to the new version of master data as needed.

Processes (e.g., a customer order) can also reference a fixed historical state of master data. Any change in master data would then no longer affect running processes associated with historical data, and, thus, less stringent consistency checks would be required.

The client systems 102-106 and the master data server 100 have layered software architectures.

Figure 5:
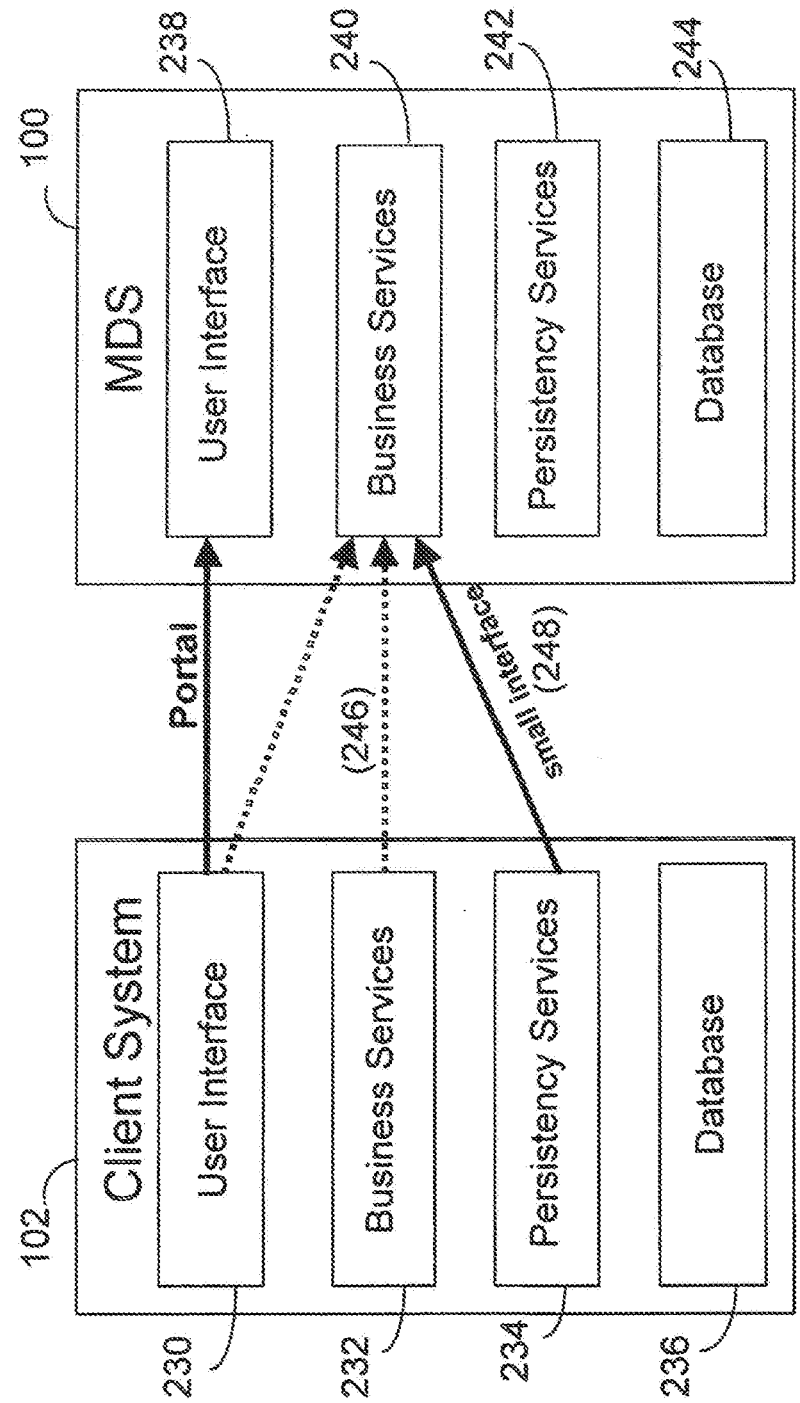
FIG. 5 is a diagram showing a software architecture for the master data server and the client systems.

Referring to FIG. 5, in one example of system 10, client system 102 includes a user interface 230, a business services layer 232, a persistency services layer 234, and a database 236. Likewise, master data server 100 includes a user interface 238, a business services layer 240, a persistency services layer 242, and a master database 244. Each software layer in client system 102 and master data server 100 accesses the functions of the layer directly underneath it within each system. When client system 102 needs to access data in database 244 of master data server 100, business service layer 232 of client 102 communicates 246 with business services layer 240 of master data server 100 for access to master data.

Only master data server 100 has access to master data in master database 244. In one mode of operation, client system 102 keeps no master data, and uses its own persistency services 234 for client-specific process data. By using, e.g., a portal, user interfaces 230 and 238 can be integrated, allowing a user to link or navigate from user interface 230 to user interface 238.

User interface 230 and business services layer 232 of client system 102 can access the business services layer 240 of master data server 100 directly, e.g., through an exchange interface or web services. Persistency services layer 234 of client system 102 can use the business services layer 240 of master data server 100 through a interface 248 to delegate the persistence of the master data.

A user of client system 102 can decide to access master database 244 from business services layer 232 (through link 246) or persistency services layer 234 (through link 248) depending on architectural requirements. An advantage of connecting from persistency services layer 234 is that the number of services in persistency services layer 234 usually is lower than the number of services in business services layer 232. This results in less effort in adapting client system 102 so that it can access master database 244. Another advantage of connecting from persistency services layer 234 is that accessing master data server 100 from persistency services layer 234 allows business services layer 232 to be configured independently, regardless of where data are stored. This makes it easier to implement a hybrid architecture in which one software "instance" of master data can be used in distributed environments as well as in an integrated installation scenario. In a hybrid architecture, persistency services layer 234 is designed so that it can either access a local database 236 or a remote master database 244 through business services layer 240 of master data server 100. This makes it possible to decide at the point of customizing the software at the client site whether the data are maintained locally or remotely.

Master data are exchanged between the client systems 102-106 and the master data server 100 using messages. The integration server 114 is responsible for the routing and mapping of the messages. The integration server 114 has information about the clients, and is able to select the appropriate mapping of the messages, data types, and interfaces.

An advantage of using the integration server 114 is that little or no code has to be added on the client systems 102-106 or on the master data server 100. The mapping rules are maintained and stored on the integration server 114. In one example, the mapping rules are developed by people who develop applications for the clients.

The integration server 114 carries out simple mappings of data types, messages, and interfaces by using rules implemented in a transformation language. More complex mapping rules that cannot be described in a transformation language can be implemented in a conventional programming language on the integration server 114.

The following illustrates an example of a client accessing master data.

Figure 6:
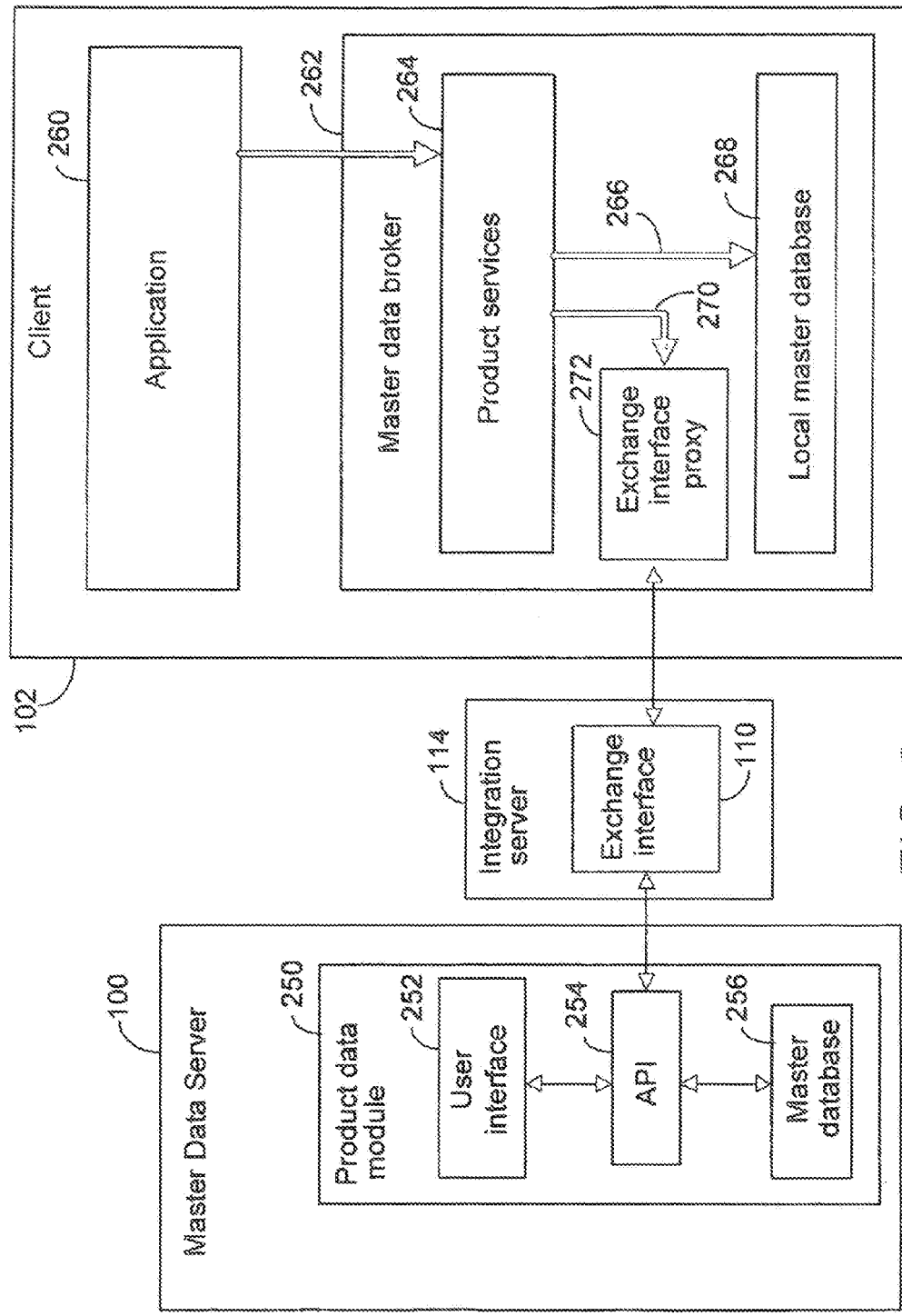
FIG. 6 shows a client system accessing master data from a master data server.

Referring to FIG. 6, master data server 100 includes a product data module 250 used to manage product data. Product data module 250 includes a user interface component 252, an application programming interface component 254, and a master database 256. A client application 260 accesses the product data module 250 by calling application programming interfaces of master data broker 262, which performs the functions of caching and authority checking, and determines whether to access data stored locally (when client is configured as a stand-alone system) or to access data stored remotely (when client is configured to interact with a master data server). When client 102 interacts with a master data server 100, some data may also be cached locally (e.g., in the memory of client 102).

Master data broker 262 includes a product services component 264, an exchange interface proxy 272, and a local master database 268. Product services component 264 provides application programming interfaces that can be called by application 260. If client 102 is a stand-alone system, product services component 264 may access data stored in local master database 268 through path 266. If client 102 is configured to interact with master data server 100, product services component 264 may communicate with the exchange interface proxy 272 through path 270. Exchange interface proxy 272 communicates with application programming interfaces 254 of master data server 100 through the exchange interface 110 of integration server 114. Application programming interfaces 254 are used to access master data stored in master database 256. Whether client 102 is configured as a stand-alone system or as part of a networked system that interacts with master data server 100, master data are maintained in one database—either the local master database 268 or the master database 256.

Links may be provided between data objects. For example, master data objects and process objects can be associated with a certain semantic. The implementation is done with patterns like a time dependent attributive n:m association, e.g., generic customer relationship management interlinkages.

While master data are stored on master data server 110, the decision whether links between master data objects should be stored on master data server 110 depends on usage of the link in the connected clients. If the semantic of a link is needed in many systems, the link is stored on the master data server 110. In general, the master data server 110 does not know (or store) process data. Therefore, the client 114 is responsible for maintaining the link from its process data to the referenced master data. Sometimes it may be necessary to keep a link to process data on the master data server 110. The implementation of such a link on the master data server 100 is generic.

System 10 is designed so that components in the master data server 100 and components in the client systems 102-106 can be updated independently. This independence is achieved in two ways. First, each client is allowed to require a minimum release of the master data component. Thus, to update the client, the master data server 100 may first be updated to permit this minimum release. This approach can be used when the master data server 100 is backward compatible and allows the client systems to access the full functionality of the master data server 100. Second, totally independent upgrades could take place. Each client is designed in a way so that it can deal with a master data server 100 with less functionality than its processes require. This can be achieved by reducing the process functionality or by extending the master data functionally on that client, including a persistence of the extended data.

To increase the speed of accessing master data, a caching mechanism is provided at the client system to reduce the amount of inter-system messaging, mapping, and transformation.

Read access of master data occurs more often than the other master data processes and it is often a part of time-critical applications. By caching data on the client side, read access operations can be performed faster.

Different approaches may be used for implementing a cache on the client. Which approach is better will depend on the master data architecture. One approach is to cache the data in the integration server. The integration server caches the responses to read-message operations. If an identical message is sent again, the response can be delivered from the cache. In another approach, caching can be performed at a message level. The messages are cached by the master data application. In yet another approach, object models are cached. Often, the client master data transaction has a cache mechanism. This cache can also be used when communicating with the master data server.

To achieve an adequate caching result, the cached contents need to be shared between sessions of the client. Typically, this is achieved by making the cache persistent on the database. Using the new basis technology of shared objects, the cache in memory can also be shared to improve performance.

When a persistent cache is used, the client should register the time of last access so that old entries can be deleted from the cache.

Cached data needs to be invalidated when the data are no longer useful. Because master data are seldom changed, a better approach is to use an explicit invalidation, rather than invalidating periodically. When master data are changed, this information is broadcast to all clients, so that they can invalidate their cache. The clients can also reread all invalidated entries at a convenient time, e.g., during the night. Caching mechanism can be offered at the server side. A shared cache between sessions would result in performance improvement.

System 10 implements authorities checks to limit the access of certain data objects to certain users, processes, or application programs. Authority checks may be implemented by using access control lists associated with the data objects. The data object itself contains the accessibility information. Authority checks may also be implemented based on object type level. On an object level, different granularities may be defined for authorizations. Authorization may be based on object types: e.g., certain materials or certain business partners may be accessed by certain users. Authorization may be based on object groups: e.g., materials of type XYZ may be accessed certain users. Authorization may be based on object instances: e.g., material 4711 may be accessed by certain users.

Master data server maintains the authority information (and also checks) for master data access (e.g., reading product data). Authority checks for master data access may be performed (1) by the master data server 100 only, (2) by the client system only, or (3) by both the master data server 100 and the client systems. If the authority check is performed by the client systems, the authority information stored centrally in the master data server 100 needs to be replicated to the client systems.

More complex authority checks are performed if a data object is a relation between two other objects, such as between a product and its location. The authority check may be performed by using an authority object that specifies access authority for the combination of the two objects. Transaction related checks (used to control the use of a transaction) can be combined with product type related checks. An authority check for a product may require additional authority checks for related objects, such as location or sales organization.

Authority checks for master data access are performed by the master data server 100 when a user or a process (e.g., an application program) attempts to read, create, change, or delete master data objects. In one example, only administrators are allowed to delete master data. Client systems may perform additional authority checks that are application or process specific. For example, a user may not be allowed to enter a certain product with a price greater than a given limit in a purchase order.

The following are examples of authority checks on master data access. In one situation, such as for relationship management applications, there are many users who have access to product data. Authorizations for accessing products are achieved by grouping products into catalogs, assigning these catalog to users or organizational units, and controlling access to the catalogs. In a second situation, such as for supply chain management applications, planners may access many locations or products to obtain an optimal planning result. Authority checks often are performed within each transaction (i.e., each time the planner accesses an object, an authority check is performed). This can be done by a central authority check function, which can combine several basic checks.

In a third situation, such as for customer relationship management applications, standard authority checks may be performed on transactions and on some attributes (such as authority group or sales organization) on the product level. In the fourth situation, such as for product lifecycle management applications, in which secrecy is important during stages of product development, an elaborate authority check with access control lists may be used so that only a few users can view an object.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

The invention has been described in terms of particular embodiments. Other embodiments are within the scope of the following claims. For example, the processes of the invention can be performed in a different order and still achieve desirable results. Moreover, while certain disclosed embodiments have been described using components available from SAP, the invention is not limited to master data systems employing SAP components. In FIG. 1, exchange infrastructure 110 is implemented using a centralized scheme, i.e., one exchange infrastructure 110 services several client systems. Exchange infrastructure 110 can also be implemented using peer-to-peer connections. The content integrator 108, rather than being part of integration server 114 as in FIG. 1, can be a component that is separate from the integration server 114. In an heterogeneous IT system in which client systems are integrated with the system from the beginning, client systems enter master data into master database 116 directly from the beginning, and it may be possible to eliminate the content integrator 108 since there are no data objects that need to be consolidated.

The master data server 100 and the client systems 102-106 may also use the same identifiers for master data objects if they agree upon a set of rules for the identifiers. Integration server 114 performs mapping of the master data objects from one format to another without the need to perform mapping of the identifiers.

What is claimed is:

1. A system, comprising:
a master data server, to maintain a master database at a data server, the master database comprising master data objects, the master database accessible to clients comprising a first client and a second client;
an integration server, in response to a request from the first client to access master data identified by a first client identifier, to map the first client identifier to a master identifier, retrieve a master data object from the master database based on the master identifier, and map the master data object to a mapped data object based on a set of mapping rules associated with the first client, wherein the master data object has a plurality of attributes associated with characteristics of an entity represented by the master data object, the first client processes a first subset of the plurality of attributes, the second client processes a second subset of the plurality of attributes, the first subset being different from the second subset, and
a mapping table to store information related to mapping of client identifiers to master identifiers, the first client identifier from the client identifiers identifying the master data object in the first client, a second client identifier from the client identifiers identifying the master data object in the second client, and the master identifier from the master identifiers identifying the master data object in the master data server.

2. The system of claim 1, wherein the first client and the second client use different client identifiers to identify the master data object.

3. The system of claim 1, wherein the mapping table to store mapping rules associated with the clients, the mapping rules comprising the set of mapping rules associated with the first client.

4. The system of claim 1, wherein the integration server dynamically maps the master data object in the master database to the mapped data object based on mapping rules defined by the first client each time the first client requests the master data object without replicating the master data object at a database local to the first client.

5. The system of claim 1, wherein the integration server comprises a content integrator that finds characteristics that at least the first client and the second client associate with the master data object.

6. The system of claim 1, wherein the integration server comprises an adapter that receives communications from the first client, extracts master data from the communications and forwards the extracted master data to the master data server.

7. The system of claim 1, wherein the master data object is associated with products.

8. The system of claim 1, wherein the master data object is associated with business partners.

9. A method, comprising:
- maintaining a master database at a data server, the master database comprising master data objects, the master database accessible to clients comprising a first client and a second client;
- receiving a request from the first client to access master data, the request comprising a first client identifier;
- mapping the first client identifier to a master identifier;
- retrieving a master data object based on the master identifier;
- mapping the master data object to a mapped data object based on a set of mapping rules associated with the first client;
- sending the mapped data object to the first client, wherein the master data object has a plurality of attributes associated with characteristics of an entity represented by the master data object, the first client processes a first subset of the plurality of attributes, the second client processes a second subset of the plurality of attributes, the first subset being different from the second subset, and
- storing, in a mapping table, information related to mapping of client identifiers to master identifiers, the first client identifier from the client identifiers identifying the master data object in the first client, a second client identifier from the client identifiers identifying the master data object in the second client, and the master identifier from the master identifiers identifying the master data object in the master data server.

10. The method of claim 9, further comprising receiving a request from the first client to modify the master data object to create a modified master data object, and querying other clients from the clients to verify that the modified master data object conforms to consistency rules defined by the other clients.

11. The method of claim 10, further comprising, responsive to determining that a particular client does not respond to the querying, placing the particular client on an exception list to indicate that the modified master data object has not been verified to conform to the consistency rules defined by the particular client.

12. The method of claim 11, further comprising, after a predefined period of time or when the particular client attempts to access data in the master database, performing another attempt to verify whether the modified master data object conforms to the consistency rules defined by the particular client.

13. The method of claim 9, further comprising receiving a request from the first client to delete the master data object from the master database, querying other clients from the clients to verify that the master data object is not used by the other clients, and deleting the master data object from the master database after confirming the master data object is not used by the other clients.

14. The method of claim 9, further comprising storing the master data object in a cache, and retrieving the master data object from the cache in response to determining that a request for access to the master data object is identical to a previous request for access to the master data object.

15. The method of claim 9, further comprising modifying the master data objects in the master database to produce modified master data objects, and modifying mapping rules associated with the master data objects to allow the clients to process the modified master data objects without making modifications at respective clients from the clients.

16. The method of claim 9, wherein the mapping rules associated with the first client define which subset of attributes from the plurality of attributes are processed by the first client.

17. A machine-readable non-transitory storage medium having instruction data executable by a machine to cause the machine to perform operations comprising:
- maintaining a master database at a data server, the master database comprising master data objects, the master database accessible to clients comprising a first client and a second client;
- receiving a request from the first client to access master data, the request comprising a first client identifier;
- mapping the first client identifier to a master identifier;
- retrieving a master data object based on the master identifier;
- mapping the master data object to a mapped data object based on a set of mapping rules associated with the first client;
- sending the mapped data object to the first client, wherein the master data object has a plurality of attributes associated with characteristics of an entity represented by the master data object, the first client processes a first subset of the plurality of attributes, the second client processes a second subset of the plurality of attributes, the first subset being different from the second subset; and
- storing, in a mapping table, information related to mapping of client identifiers to master identifiers, the first client identifier from the client identifiers identifying the master data object in the first client, a second client identifier from the client identifiers identifying the master data object in the second client, and the master identifier from the master identifiers identifying the master data object in the master data server.

18. A method, comprising:
- maintaining a master database at a data server, the master database comprising master data objects, the master database accessible to clients comprising a first client and a second client;
- receiving a request from the first client to access master data, the request comprising a client identifier;
- mapping the client identifier to a master identifier;
- retrieving a master data object based on the master identifier;
- mapping the master data object to a mapped data object based on a set of mapping rules associated with the first client; and
- sending the mapped data object to the first client, wherein the master data object has a plurality of attributes associated with characteristics of an entity represented by the master data object, the first client processes a first subset of the plurality of attributes, the second client processes a second subset of the plurality of attributes, the first subset being different from the second subset.

* * * * *